United States Patent Office 2,909,278
Patented Oct. 20, 1959

2,909,278

ADHESIVE-COATED FABRICS

Benjamin B. Blackford, Metuchen, N.J., assignor to Johnson & Johnson, a corporation of New Jersey No Drawing. Application September 3, 1957
Serial No. 681,446

19 Claims. (Cl. 206—59)

This invention relates to pressure-sensitive adhesive-coated fabrics and more particularly to pressure-senitive adhesive tapes having improved aging characteristics.

In conventional adhesive tapes, it is the commercial practice to apply the adhesive mass to the cloth backing in a layer having an average thickness of about 0.005". If the adhesive mass is applied at lower gauges, it displays, as the gauge is reduced, an increasing tendency to lose tack and adhesion after extended periods of aging. Also, it is found that the tape becomes more difficult to remove from the roll and with continuing aging wrinkles and distortion of the roll occur. As the temperature at which the rolls of adhesive tape are stored is increased, these undesirable aging characteristics are aggravated and accelerated so that in tropical areas even tapes in which the adhesive mass has the conventional thickness of about 0.005" store unsatisfactorily, the tapes soon becoming difficult to unwind and showing a substantial loss of tackiness when later applied. Also, there is a tendency with some adhesive masses, for the rolled adhesive tape, as it ages, to become discolored. This is highly undesirable, particularly for adhesive tapes that are designed for surgical use, since a clean, white color is generally desired for such tapes.

It is one of the objects of the present invention to prepare adhesive tapes which will have substantially improved aging characteristics with respect to maintaining their ease of unrolling and effective adhesive characteristics. It is a further object to prepare pressure-sensitive adhesive-coated tapes that have substantially lower gauges of adhesive, with resulting reduction in cost of manufacture, than those presently used while still maintaining their characteristics of easy unwinding and good tackiness even after extended periods of aging. It is a still further object of the present invention to prepare pressure-sensitive adhesive-coated tapes which will not discolor or wrinkle even in hot climates after extended periods and will maintain their original tack and ease of unwinding.

It has been discovered that these and other objects are realized and the above described objectionable characteristics normally occurring on aging are avoided if a small amount of very fine, particulate silica is included in the adhesive mass prior to spreading on the fabric backing.

The silica used should have a particle size within the range of about 0.01 to 0.03 micron and should be incorporated in the adhesive mass in amounts of about 1 to 10% by weight silica. The best results are obtained where the silica is included in amounts of about 2 to 8% by weight. A fine, particulate silica found to be particularly suitable is that sold by Godfrey L. Cabot Inc. under the trade name Cab-O-Sil. This silica is prepared by the vapor phase hydrolysis of silicon compounds.

The inclusion of very fine, particulate silica, in any of the generally used pressure-sensitive elastomer based adhesives, substantially improves the aging of these adhesives, when applied to fabric bases, so as to prevent loss in tack, increasing difficulty of unwinding, and deformation of the tape when stored in rolls. Adhesives of this type usually contain an elastomer, a tackifier, a plasticizer, a stabilizer and a filler in amounts varying within the range of 10 to 60% elastomer, 15 to 40% tackifier, 0 to 15% plasticizer, 0.25 to 4.0% stabilizer, and 0 to 40% filler, percents being percent by weight. The elastomer may be any type of natural rubber such as crepe rubber, reclaimed rubber or crude rubber or may be of the synthetic rubber type such as butadiene and butadiene copolymer elastomers and polyisobutylene elastomers. The tackifier may be a polyterpene, disproportionated rosin, esters of hydrogenated rosin or other tackifiers well known in the art. The plasticizer may be any suitable rubber plasticizer such as lanolin, naphthenic petroleum oils, and low molecular weight polyisobutylene (molecular weights of about 2,000). Usually, any antioxidant is suitable as a stabilizer, zinc dibutyl dithiocarbamate described in U.S. patent to Bemmels, 2,615,059, being an example. The filler may be any finely divided, substantially white, or colorless, inert solid, suitable fillers being clays, calcium carbonate, or other finely divided inert material. The filler should not be confused with the very fine, particulate silica which has a particle size substantially smaller than that of the fillers referred to above.

The invention is further illustrated by the following examples which are limited to a particular rubber base adhesive mass so as to better illustrate the comparative aging properties of adhesive masses containing no fine, particulate silica and those containing fine, particulate silica in accordance with the present invention. For examples of other suitable adhesive masses, including those using synthetic elastomers, in which aging can be improved by the inclusion of very fine, particulate silica in accordance with the present invention, attention is called to the U.S. patent to Wing, 2,484,060, of October 11, 1949 and U.S. patent to Bemmels, 2,615,059, of October 21, 1952.

*Example 1*

The following compositions were prepared by blending all ingredients, except 25% of the disproportionated rosin, in a Banbury mixer and were completed by adding the remaining resin on a conventional rubber mill.

|  | (a) | (b) | (c) | (d) |
|---|---|---|---|---|
| Rubber, Natural Raw | 33 | 33 | 33 | 33 |
| Disproportionated Rosin (dehydrogenated rosin) | 28 | 28 | 28 | 28 |
| Particulate Silica |  | 2 | 5 | 8 |
| Lanolin | 10 | 10 | 10 | 10 |
| Inert Filler (consisting primarily of Titanium Dioxide and Zinc Oxide) | 22.5 | 22.5 | 22.5 | 19.5 |
| Antioxidant (zinc dibutyl dithiocarbamate) | 1.5 | 1.5 | 1.5 | 1.5 |
| Cornstarch | 5 | 3 |  |  |

The above masses were calendered at 5 oz./sq. yd. (adhesive layer 0.005" thick) on a cotton fabric of count 80 x 80 having a weight of approximately 3.0 oz./sq. yd. The adhesive-coated fabrics were then cut and wound at a controlled tension in 1" x 10 yd. rolls on 1" paper cores so that immediately after winding they could be unwound at tensions of less than 6 oz./inch of width. These rolls were stored for periods up to fourteen months at a temperature of 120° F. with the following results:

| Formula | Tack | Ease of Unrolling | Appearance | Color |
|---|---|---|---|---|
| (a) | Very poor | Could not unroll without offsetting mass to backing. | Distorted, also tacky on the back. | Visibly yellowed. |
| (b) | Good | Readily unwound | No change | Slight change. |
| (c) | do | do | do | Do. |
| (d) | do | do | do | No change. |

It will be noted from the above that the silica modified adhesive-coated tapes displayed no roll distortion, could be unwound easily and exhibited good surface tack with little or no discoloration. The control sample (a), however, containing no silica exhibited roll distortion, discoloration, was difficult to unroll and had poor tack properties.

*Example 2*

Rolls of adhesive-coated tape were prepared as in Example 1 with the exception that the rolls containing the adhesive formulation (c) were spread on the fabric at a weight of 4.0±0.25 oz./sq. yd. (adhesive layer 0.004" thick) and the rolls containing the control formulation (a) were spread at 5.0±0.25 oz./sq. yd. (adhesive layer 0.005" thick). These rolls were subjected to accelerated aging at 150° F. for 28 days. After the 28-day period, the sample coated with mass (c) containing the silica exhibited little or no change whereas the control sample with the adhesive mass (a), even though present as an appreciably thicker coating, exhibited almost complete loss of tack and adhesion when tested by adhesion to a glass plate.

Tapes prepared in this manner were also aged for six weeks at 100° F. The control sample containing adhesive (a) exhibited substantial difficulty with respect to unwinding and partial loss of tack while the silica containing sample coated with adhesive mass (c) showed little change and was completely suitable for use as a surgical tape. These tests clearly showed that a reduced weight of silica modified adhesive is substantially more effective after aging than a heavier layer of adhesive containing no fine, particulate silica.

In view of the foregoing disclosures, variations or modifications thereof will be apparent, and it is intended to include within the invention all such variations and modifications except as do not come within the scope of the appended claims.

Having thus described my invention, I claim:

1. The method of improving the aging of pressure-sensitive adhesive-coated webs comprising blending into the adhesive, prior to application to the fabric, 1 to 10% by weight, based on the adhesive, of a fine, particulate silica having an average particle size of about 0.01 to 0.03 micron.

2. A pressure-sensitive adhesive-coated fabric comprising a fabric base having spread thereon a thin coating of an elastomer base pressure-sensitive adhesive containing 1 to 10% by weight of fine, particulate silica having an average particle size of about 0.01 to 0.03 micron.

3. A pressure-sensitive adhesive-coated fabric of claim 2 wherein the silica is present in amounts of 2 to 8%.

4. A roll of pressure-sensitive adhesive tape wherein the tape comprises a fabric base having spread thereon a thin coating of an elastomer base pressure-sensitive adhesive containing 1 to 10% by weight of very fine, particulate silica having an average particle size of about 0.01 to 0.03 micron.

5. A pressure-sensitive adhesive-coated tape of claim 4 wherein the silica is present in the adhesive in amounts of 2 to 8% by weight.

6. In an article of manufacture, a fabric coated with a thin layer of a pressure-sensitive adhesive comprising 10 to 60% by weight elastomer, 15 to 40% by weight tackifier, 0 to 15% by weight plasticizer, 0.25 to 4.0% by weight stabilizer, 0 to 40% by weight filler and 1 to 10% by weight finely divided silica having an average particle size of about 0.01 to 0.03 micron.

7. An article of claim 6 in which the adhesive-coated fabric is in the form of an adhesive tape rolled on itself.

8. In an article of manufacture, a web coated with a thin layer of a pressure-sensitive adhesive comprising 10 to 60% by weight of an elastomer selected from the group consisting of crepe rubber, reclaimed rubber, crude rubber, butadiene and butadiene copolymer elastomers and polyisobutylene elastomers, 15 to 40% by weight of a tackifier selected from the group consisting of dehydrogenated rosin, esters, of hydrogenated rosin and polyterpenes, 0 to 15% by weight of a plasticizer selected from the group consisting of lanolin, naphthenic petroleum oils and low molecular weight polyisobutylenes, 0.25 to 4.0% by weight antioxidant, 0 to 40% by weight of inert filler and 1 to 10% by weight of finely divided silica having an average particle size of about 0.01 to 0.03 micron.

9. An article of claim 8 in which the adhesive-coated web is in the form of an adhesive-coated tape rolled on itself.

10. An article of claim 8 in which said elastomer is natural raw rubber and in which said tackifier is dehydrogenated rosin.

11. An article of claim 10 in which the silica is present in amounts of 2 to 8% by weight.

12. An article of manufacture comprising a web coated with a thin layer of pressure-sensitive adhesive comprising 33% by weight natural raw rubber, 28% by weight dehydrogenated rosin, 10% by weight lanolin, 1.5% by weight zinc dibutyl dithiocarbamate, 1 to 10% by weight finely divided silica having an average particle size of 0.01 to 0.03 micron and the remainder inert filler.

13. An article of claim 12 in which the silica is present in amounts of 2 to 8%.

14. An article of claim 12 in which the adhesive-coated web is in the form of an adhesive-coated tape rolled on itself.

15. A pressure-sensitive adhesive comprising 10 to 60% by weight of an elastomer selected from the group consisting of crepe rubber, reclaimed rubber, crude rubber, butadiene elastomers and polyisobutylene elastomer, 15 to 40% by weight of a tackifier selected from the group consisting of dehydrogenated rosin, esters of hydrogenated rosin and polyterpenes, 0 to 15% by weight of a plasticizer selected from the group consisting of lanolin, naphthenic petroleum oils and low molecular weight polyisobutylenes, 0.25 to 4.0% by weight antioxidant, 0 to 40% by weight of inert filler and 1 to 10% by weight of finely divided silica having an average particle size of about 0.01 to 0.03 micron.

16. A pressure-sensitive adhesive of claim 15 in which the elastomer is natural raw rubber and in which said tackifier is dehydrogenated rosin.

17. A pressure-sensitive adhesive of claim 16 in which the silica is present in amounts of 2 to 8% by weight.

18. A pressure-sensitive adhesive comprising 33% by weight natural raw rubber, 28% by weight dehydrogenated rosin, 10% by weight lanolin, 1.5% by weight zinc dibutyl dithiocarbamate, 1 to 10% by weight finely divided silica having an average particle size of 0.01 to 0.03 micron and the remainder inert filler.

19. A pressure-sensitive adhesive of claim 18 in which the silica is present in amounts of 2 to 8%.

References Cited in the file of this patent

UNITED STATES PATENTS

| | | |
|---|---|---|
| 1,484,334 | Kermer | Feb. 19, 1924 |
| 2,156,083 | Dalton | Apr. 25, 1939 |
| 2,377,647 | Pragoff | June 5, 1945 |
| 2,561,362 | Guillot | July 24, 1951 |
| 2,746,179 | Perkins | May 2, 1956 |

FOREIGN PATENTS

| | | |
|---|---|---|
| 698,716 | Great Britain | Oct. 21, 1953 |